E. P. BULLARD, Jr.
TAPPING TOOL FOR COUPLING FINISHING MACHINES.
APPLICATION FILED SEPT. 24, 1920.

1,436,752.

Patented Nov. 28, 1922.
4 SHEETS—SHEET 1.

INVENTOR
E. P. Bullard Jr.
by D. Anthony Usina
his attorney.

Patented Nov. 28, 1922.

1,436,752

UNITED STATES PATENT OFFICE.

EDWARD P. BULLARD, JR., OF BRIDGEPORT, CONNECTICUT, ASSIGNOR TO NATIONAL TUBE COMPANY, OF PITTSBURGH, PENNSYLVANIA, A CORPORATION OF NEW JERSEY.

TAPPING TOOL FOR COUPLING FINISHING MACHINES.

Application filed September 24, 1920. Serial No. 412,565.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Tapping Tools for Coupling Finishing Machines, of which the following is a specification.

My invention relates to tapping tools used for cutting screw threads on the interior of pipe couplings and similar internally threaded articles. This invention more particularly relates to the construction of tapping tools used for cutting double-taper screw threads on the inner surface of pipe couplings and the like.

One object of this invention is the provision of a thread cutting tap and tap operating mechanism having novel means whereby the chasers of the tap are actuated and caused to cut a continuous double-taper screw thread on the interior of the couplings or other articles being tapped.

Another object of the invention is the provision of a collapsing tap and tap operating mechanism having novel means for automatically retracting the collapsible chasers of the tap to enable the tap to be removed from the threaded couplings at the completion of each thread cutting operation with a quick return movement and without unscrewing the tap from the threaded couplings.

Another object of my invention is to provide a tapping tool having novel means whereby the chaser carrying spindle or sleeve and cam carrying spindle are raised and lowered into and out of operative position in the coupling tapping operations.

A further object of the invention is the provision of a tapping tool having improved means whereby one chaser cam or set of chaser cams is adjusted toward and away from another cam or set of cams in assembling its parts and in operating the tapping tool.

A further object of the invention is to provide a collapsing tap for cutting taper screw threads, having improved means whereby the diameter of the thread may be increased or lessened without variation in the taper of the thread cut by the tap, and, when cutting double-taper threads, without change in the relative angle of the oppositely tapering portions of the double-taper threads cut by the tap.

A still further object of this invention is the provision of a tap having a novel arrangement of chasers and chaser cage or sleeve whereby the chasers are readily removed to be sharpened or to be replaced by other chasers.

Still further other objects of my invention will become clearly apparent by reference to the detailed description and appended claims, and to the accompanying drawings, forming part of this specification, in which—

In the accompanying drawings, my improved collapsing tapping tool is shown applied for use on a boring mill or similar machine tool in accordance with my invention.

The boring mill, which is of standard construction, has a base 2 and base extension 3, with a rotary platen or table 4 operatively mounted on the base 2 and an electric driving motor 5 which is secured on the extension 3. The rotary table 4 is provided with a work holding chuck 6, by which the pipe coupling A or other article being threaded is held and caused to rotate with the table 4 in the thread cutting operations, and the table 4 is operatively connected by reducing gearing to the armature shaft 7 of the driving motor 5.

The usual standards or housings 8—8 are provided on the base 2 and a horizontal cross arm 9 is movably secured adjacent to its ends on the housing 8—8 so as to be vertically adjustable thereon. The cross-arm 9 has a cross head 10, which is adjustable horizontally or transversely on the cross-arm 9 by means of a threaded shaft 10ᵃ which has a screw threaded engagement with a nut 10ᵇ secured to the cross-head 10 and is provided with a hand-wheel 10ᵈ on one end. The cross-head 10 supports the vertically lengthwise and lengthwise adjustable tool post 11 of the boring mill. The boring mill is provided with driving gearing which is operatively connected to the shaft 7 of the motor 5 so as to positively move the cross-arm 9 on the housing 8—8 and the cross-head 10 on the cross-arm 9, as well as to positively move the tool post 11 vertically on the cross-head 10, in adjusting these several parts and in feeding the tapping tool into the coupling. Means are also provided whereby the cross-arm, cross-head, and tool post may be independently adjusted by hand.

The tool post 11 is hollow and slides vertically in guides or ways on the cross-head 10, but does not rotate. The lower end of the hollow tool post 11 is counterbored and rigidly secured in the counterbore by means of cap bolts 12ᵃ so as to move with but not relative to the tool post, is one end of the chaser sleeve or cage 12 forming a part of my improved tapping tool. A feather key or spline 13, which is seated in registering keyways in the surface of the counterbore and contacting periphery of the sleeve 12 prevents turning movement of the sleeve within the counterbore of the tool post.

Figure 6:
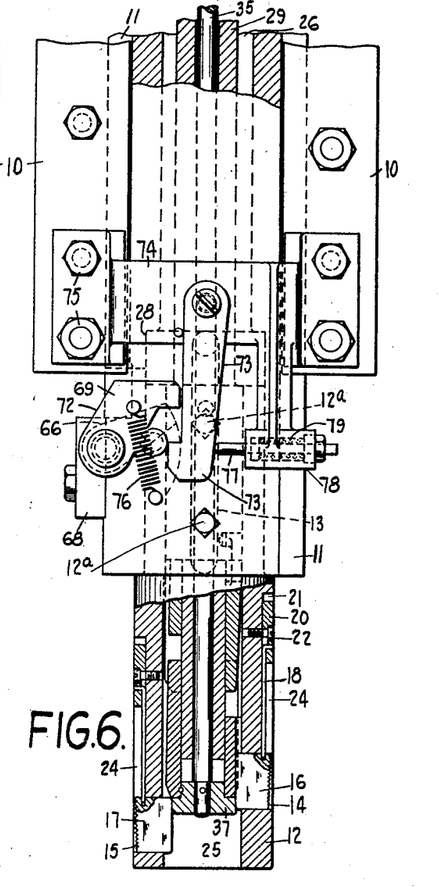
Figure 6 is a front elevation, partly in section, showing portions of the tapping machine, and the relative position of various parts of the tapping tool with the tool post raised into its lifted position after completing a coupling tapping operation, and preparatory to replacing a tapped coupling with one to be tapped.
Figure 7:
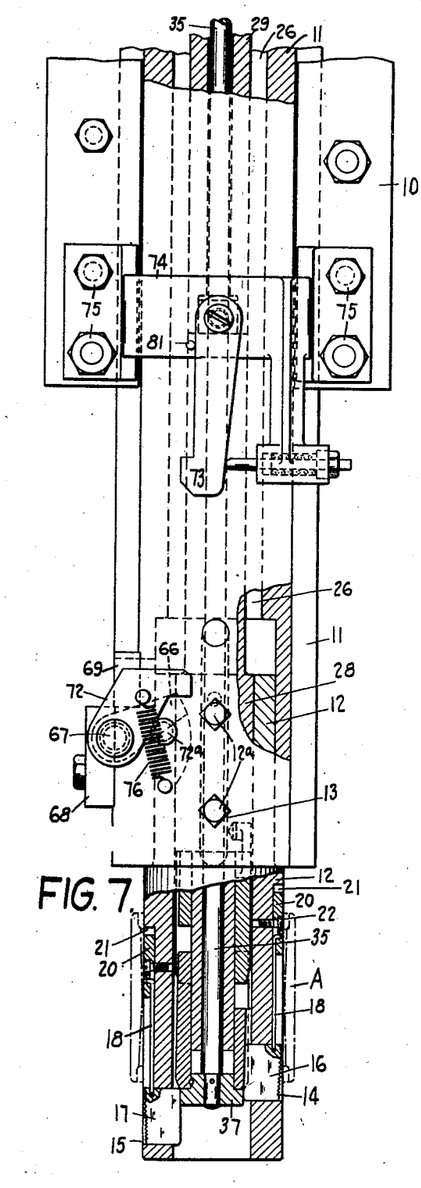
Figure 7 is a similar elevation, showing the relative location of the same parts with the tool post, chasers and cam bar in their lowermost position, as at the completion of a coupling tapping operation.

The lower projecting end of the chaser sleeve 12 is provided with two series of radial slots, there being six slots in each series as shown, and the twelve slots are equally spaced on the periphery of the sleeve 12. (See Figure 9.) The slots 14 of the uppermost series are staggered relative to the slots 15 of the lowermost series, the two series being relatively located so that the lower ends of the upper series of slots 14 overlap the upper ends of the slots 15 forming the lower series. (See Figures 6, 7, and 8.) Removably secured within each of the slots is a radially adjustable thread cutter or chaser, the chasers 16 of the set in the slots 14, forming the upper series of slots, being arranged to cut a downwardly and inwardly tapering thread on the upper half of the length of the couplings, and the chasers 17 being arranged to cut a downwardly and outwardly tapering continuation of the thread on the lower half of the length of the couplings.

While six chasers are used for each of the two sets, it is obvious that the number in each set may be increased or lessened and that the number employed will largely be dependent upon the diameter of the thread to be cut thereby.

Figures 8, 9, 10, 11, 12, 13:
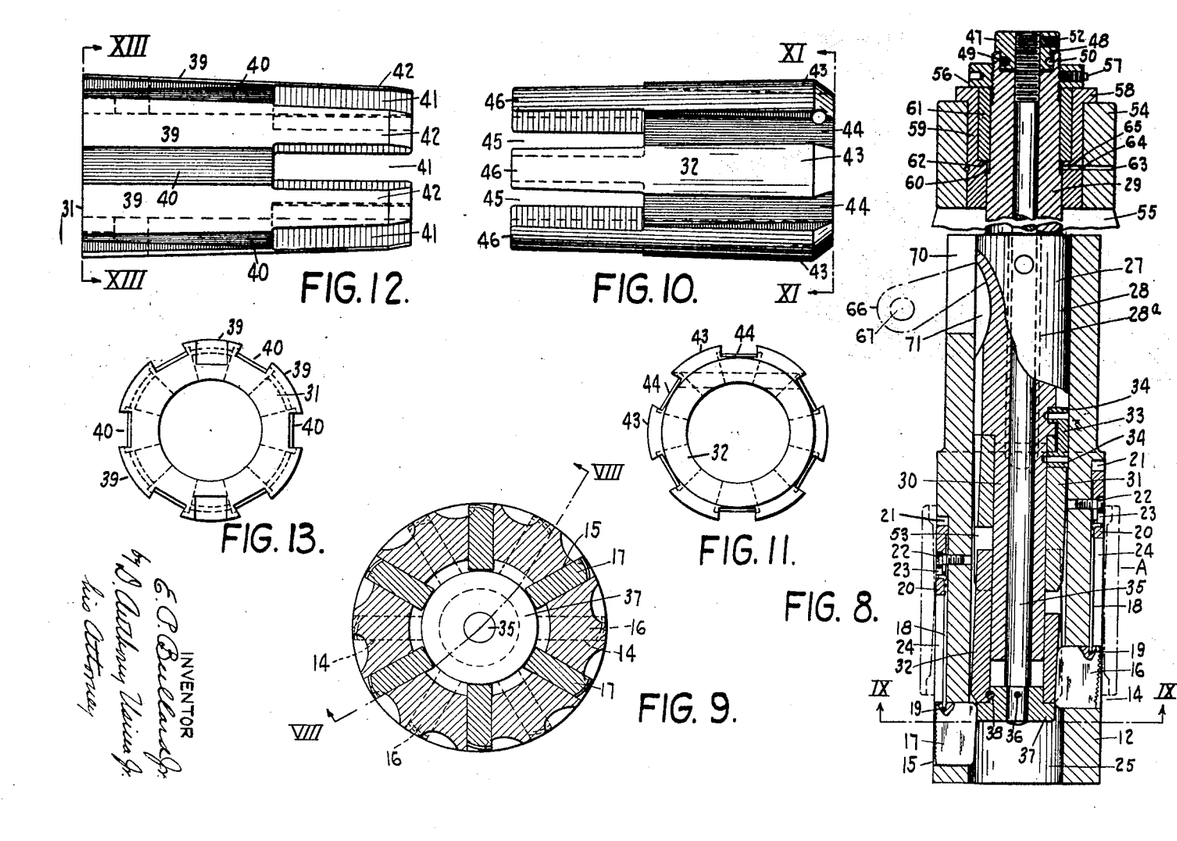
Figure 8 is a longitudinal section, on the irregular line VIII—VIII of Figure 9, showing the relative position of the various parts at the completion of the tapping operation, with the chasers of the tapping tool in retracted or collapsed position, in readiness to be withdrawn from a tapped coupling, showing the means whereby the cam bar is lifted with the tool post and chasers.
Figure 9 is a transverse section on the line IX—IX of Figure 8 showing further details in the construction of the tapping tool.
Figure 10 is a detail plan of one section or cam member of the chaser controlling cams.
Figure 11 is an end elevation of the cam member shown in Figure 10.
Figure 12 is a plan, similar to Figure 10, of the opposite section or cam member of the chaser controlling cams.
Figure 13 is an end elevation of the cam member of Figure 12.

By reference to Figure 8 it will be seen that the chasers 17 forming the lower set commence cutting the thread at some distance above the middle of the length of the coupling, so that after the upper set of chasers have completed their work the finished thread is of constant pitch throughout its length, although first tapering downwardly and inwardly to the middle of the length of the coupling, and then downwardly and outwardly on the inner surface of the completed coupling, with the angle of the so-formed double-taper changing at the middle of the coupling's length.

The chasers 16 and 17 are yieldingly held in position within the slots 14 and 15 by means of springs 18, one end of each wire forming the springs projecting into a hole 19 bored in the upper end of each of the chasers. The upper end of each wire spring is bent at right angles to the body portion thereof and the bent end extends into a transverse hole in the spring fastening clamps 20, there being one for clamping each spring. The clamps 20 are seated in shallow recesses 21 in the periphery of the chaser sleeve 12, being adjustably held therein by cap-screws 22, which extend through the elongated slots 23 in the clamps, into tapped holes in the sleeve 12. The outer face of the clamps 20 has the same transverse curvature as the cylindrical outer surface of the sleeve 12, and these faces are flush or substantially flush with this outer surface, with the heads of the cap-screws 22 extending into the enlarged portion of the slots 23, so that the clamps and heads do not project beyond the plane of the outer surface of the chaser sleeve 12. The slots 14 and 15 for the chasers 16 and 17 are connected with the recesses 21 by narrow grooves 24, in which the springs 18 are positioned when in operative position. (See Figure 8.)

Figures 1, 2, 3, 3A:
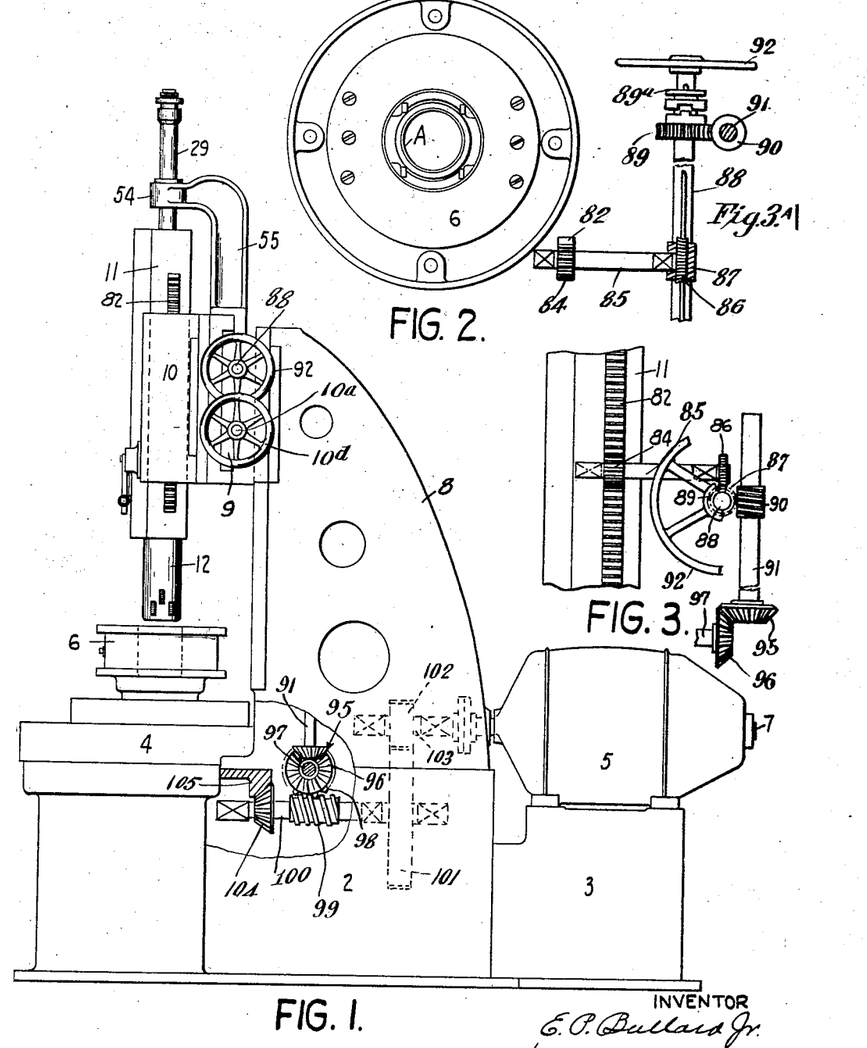
Figure 1 is a side elevation showing a coupling finishing machine having a collapsing tapping tool embodying my invention, and applied for use thereon in accordance with the invention.
Figure 2 is a plan showing the work holding chuck of the coupling finishing machine, with a pipe coupling held by the gripping jaws of the chuck.
Figures 3 and 3ª are, respectively, a diagrammatic elevation and plan showing details in the construction of the power-feed mechanism used for operating the tool post and tapping tool in the coupling threading operations.

Located within the bore 25 of the tubular chaser sleeve 12 and co-axial bore 26 of the hollow tool post 11 is a tubular cam bar 27 by which the chasers are moved and held in thread cutting position. This cam bar has an enlarged portion 28 between end portions 29 and 30 of smaller diameter, the enlarged portion having a sliding fit within the bore 25 of the sleeve 12. A spline or feather key 28ª seated in registering grooves in the engaging faces of the enlarged portion 28 on the cam bar, and the chaser sleeve 12 prevents relative rotation of these parts without interfering with the necessary amount of lengthwise sliding movement between the chaser sleeve and the cam bar. The reduced portion 29 forming the upper end of the cam bar 27 projects for some distance above the upper end of the tool post 11. (See Figure 1.) The reduced lower end 30 of the cam bar 27 is provided with two cam members 31—32, which are of peculiar construction and which form an important part of my invention, these cam members being arranged for adjustment lengthwise with the hollow cam bar in relation to the chaser sleeve 12, and the two cam members also being arranged for a relative lengthwise adjustment on the cam bar 27.

The upper cam member 31 is bored so as to fit tightly on the reduced lower end 30 of the cam bar, when forced into place thereon. This cam member also is fastened to the cam bar by means of two locking links 33, these links fitting into diametrically opposite grooves in the ends of the cam member 31, and alined grooves in the abutting end of the enlargement 28. Cylindrical projections 34 which project outwardly from one face of the links at the ends thereof extend into cylindrical openings in the bottom surface of the grooves in which the links 33 are seated and securely lock the cam member 31 against any movement thereof on the cam bar 27. (See Figure 8.) The lower cam member 32, which is adjustably fastened on the end 30 of the cam bar 27 is bored axially to have a sliding fit thereon, to permit of its being moved toward and away from the other cam member 31, as is done in assembling and adjusting the parts of my improved tapping tool in position for cutting or "chasing" double-taper threads.

The lower end of the adjustable cam member 32 is fastened to the lower end of a cam adjusting rod 35 which fits loosely in and extends through the axial opening or bore of the tubular cam bar 27. Rigidly fastened to the shouldered lower end of this adjusting rod 35 by means of a pin 36 as a washer 37, the locking pin 36 extending through registering transverse holes in the end of the rod 35 and washer 37. The periphery of the washer 37 is rabbeted and the small end thereof extends into the bore of the adjustable cam member 32 and is fastened to the cam member by a pin 38 which extends through transverse holes in the end on the cam member 32, and a registering groove in the washer 37. (See Figure 8.)

The coacting cam members 31 and 32, which are shown in detail in Figures 10 to 13, have frusto-conical surfaces on the periphery thereof. Each of these surfaces is interrupted circumferentially by a series of elongated grooves, which have parallel side surfaces and which equally space or divide the periphery of the cams into transversely curved and lengthwise tapering cam surfaces. These cam members also are cut away or slotted lengthwise, for about one-half their length, the slots being in line with the longitudinal grooves and forming a series of fingers on one end of the cam members. The side surfaces defining the width of the slots in the cam members are parallel lengthwise, but are radial transversely. (See Figures 10 to 13.)

The frusto-conical periphery of the upper cam member 31, (the one fixed to the hollow cam bar 27.) has six equally spaced cam surfaces 39 which are curved transversely and taper lengthwise inwardly toward the other cam member 32 (the one adjustably secured on the cam bar 27).

The cam surfaces 39 are separated by the grooves 40 and the slots 41, which form continuations of the grooves 40, the fingers 42 of this cam member, between or separating the slots 41, forming part of or extensions to the cam surfaces 39, and the bottom surfaces of the grooves 40 taper lengthwise at the same angle to the axis of the cam member as the cam surfaces 39, but in the opposite direction thereto.

The other or lower cam member 32 or cam member which is longitudinally adjustable on the cam bar 27, is constructed in a similar manner, its frusto-conical periphery being divided circumferentially into a series of six cam surfaces 43, which are spaced equally and which are curved transversely and taper lengthwise in the same manner as the surfaces 39 on the cam 31.

The cam surfaces 43 are separated by six grooves 44 which have lengthwise parallel side walls that are also parallel transversely, and in which the bottom surfaces taper lengthwise at the same angle to the axis of the cam member 32, but in the opposite direction to the cam surfaces 43. The cam 32 also is slotted for about one-half its length, the slots 45 forming continuations of the grooves 44 and the fingers 46 between these slots forming continuations or extensions of the cam surfaces 43.

The fingers 42 forming part of the cam surfaces 39 of the cam member 31 extend into the slots 45 in the cam member 32, so that the fingers of the two cam members are interlocked with one another and position or locate the cam surfaces 39 of the cam member 31 opposite and in alinement with the grooves 44 and slots 45 of the cam member 32. In a similar manner the cam surfaces 43 of the cam member 32 are opposite and in alinement with the grooves 40 of the cam member 31.

By reference to Figure 8 it will be clearly seen that the bottom surfaces of the grooves 40 in the cam member 31 taper at the same angle and in the same direction as the alined cam surfaces 43 of the cam member 32 and, in fact, form continuations of these cam surfaces, which engage with the inner edges of the radially adjustable chasers 17. It also will be seen that the bottom surfaces of the grooves 44 in the cam member 32 taper at the same angle and in the same direction as the cam surfaces 39 of the cam member 31, and form continuations thereof, which are adapted to engage with the inner edges of the chasers 16, in maintaining the chasers 16 and 17 in operative position. It also should be clear from the foregoing that the lower cam member 32 can be moved lengthwise toward or away from the other cam member 31 without change in the angle of the bottom surfaces of the grooves 40 and 44, or change in the angle of the cam surfaces 39 and 43, and that the lengthwise tapering bottom surfaces of the grooves in each calm member always remain parallel with the tapering cam surfaces of the other or opposite cam member.

One end of each of the pair of cam members 31, 32 is beveled or rounded-off, the large end of the adjustable lower frusto-conical cam member 32 and the ends of the fingers 42 on the small end of the other cam member 31 being chamfered so that the contacting edges of the chasers 16 and 17 will easily ride over the chamfered ends of the cam members when the tubular cam bar 27 is dropped or lowered within the hollow tool post 11, to a point beyond the lower end of the chasers 17, as is done preparatory to the commencement of each thread tapping operation, and as will be explained more fully hereafter.

Adjustment of the lower cam member 32 lengthwise in relation to the other cam member 31, as is necessary, in bringing the transverse plane in which the oppositely tapering cam faces of the cam members 31, 32 intersect into the right position relative to the lower end of the tubular cam bar 27, when this cam bar is in lowered position, is done by means of the cam adjusting rod 35 which extends through the hollow cam bar 27 and the nut 47, on its screw threaded upper end, the end of this adjusting rod 35 projecting beyond the upper end of the tubular cam bar 27. The nut 47 is rotatably fastened to the end of the tubular cam bar 27 so as to turn in the counterbore 48 in the upper end of the cam bar 27, being fastened in place by a pin 49 which extends into the peripheral groove 50 in the cylindrical end of the nut 47 and through the registering holes in the cam bar 27. (See Figure 8.)

By turning the nut 47 in a clockwise direction, the cam adjusting rod 35 is caused to move the adjustable cam member 32 on the cam bar 27 in a direction toward the cam member 31, and when the nut 47 is turned in the opposite direction the cam bar is caused to move the cam member 32 away from the cam member 31. Moving the cam member 32 toward the cam member 31 raises the plane of intersection of the cam faces 39 with the oppositely tapering cam surfaces 43 on the cam member 32. As the nut 47 on the threaded end of the cam adjusting rod 35 is rotatably fastened to the end of the tubular cam bar 27, the cam member 32 is always rigidly held in its adjusted positions on this bar. The set screw 52 in the nut 47 affords means for locking this nut against turning movement on the end of the rod 35 after an adjustment is made. (See Figure 8.)

When the cams 31, 32 are adjusted into operative relation, the cam surfaces 39 and 43 become slightly offset with respect to the cam surfaces formed by the bottom of the grooves 40 and 44, and a short gap 53 is formed between the ends of the fingers 42 and 46 and opposite ends of the slots 45, 41. The amount of the offset and length of the gap are so slight, however, as to not affect the angles at which the chasers cut the threads, because the fingers 42 of the cam 31 are of such length that the thread is completed on the upper half of the couplings before the gap is reached by the downwardly traveling chasers 16, and the chasers 17 cut the lower half of the length of the double-taper thread after they have traveled beyond the gap 53.

The cam bar 27 is arranged to move but in one direction only, within the bore 26 of the hollow tool post 11. It also is arranged to reciprocate or move in both directions with the tool post 11, when this tool post is moved lengthwise in the ways on the cross-head 10. This cam bar 27 projects for some distance above the upper end of the lengthwise vertical tool post 11, and extends through the boss or bearing 54 on the upper end of the bracket or pedestal 55, the base of which is fastened on the upper side of the cross-head 10 on the horizontal cross-arm 9 of the tapping machine.

The nut 56, which is locked in adjusted position by a set screw 57 on the threaded upper end of the cam bar 27, engages with the upper face of the flange 58 on the bushing 59 in the boss 54 of the pedestal 55 to limit downward movement of the cam bar within the bore 26 of the hollow tool post 11, and adjustment of the extreme lowered position into which the cam bar moves is made by turning the nut 56 on the cam bar.

As the cam bar drops by gravity within the bore 26 when the tool post reaches a certain position in its downward movement, an air cushion is provided on the cam bar to absorb the shock caused in dropping the cam bar and its attached parts. The bushing 59 in the boss 54 of the pedestal 55 is counterbored so as to form an annular air pocket 60 into which the annular sleeve 61 on the end of the cam bar 27 enters as the cam bar approaches its lowermost position.

The sleeve 61 is loosely mounted on the cam bar, its movement in one direction being limited by the shoulder 62 on the bushing 59, and in the other direction by the nut 56. A small hole 63 in the boss, with the groove 64 and hole 65 in the wall of the bushing 59, forms a vent for the slow escape of the air trapped within the pocket 60 when the cam bar falls, and the sleeve 61 enters this pocket. (See Figure 8.)

A swinging dog 66 on one end of a shaft 67 provides means for locking the cam bar 27 to the tool post 11, so that the cam bar will be lifted or raised by the tool post when the tool post is lifted to raise the tapping tool out of a tapped coupling, into a position permitting the finished coupling to be replaced by an untapped one. The shaft 67 is journaled in a suitable bearing 68 which is bolted to the lower end of the tool post 11, and the dog 66 extends through an elongated slot 69 in the tool post and opposite slot 70 in the upper end of the chaser sleeve 12, into a groove or slot 71 in the enlarged portion 28 of the cam bar 27. The swinging end of the dog 66 is curved, on a radius struck from the axis of rotation of the shaft 67, and the bottom of the groove or slot 71 in the enlarged portion 28 of the cam bar has the same radius of curvature, so that the dog 66 can be moved out of locking engagement with the cam bar, even while the weight of the cam bar and its connected parts is being transmitted by this dog to the tool post 11. (See Figures 6 and 8.)

While the tool post 11 is being lowered to bring the chasers of the tapping tool into position immediately above a coupling preparatory to tapping it, the dog 66 is automatically moved out of holding engagement with the cam bar 27. The cam bar, when released, as occurs when the tool post reaches one position on the cross-head 10, drops by gravity into operative position with the cam members of the cam bar within the coupling to be tapped.

Figure 4:
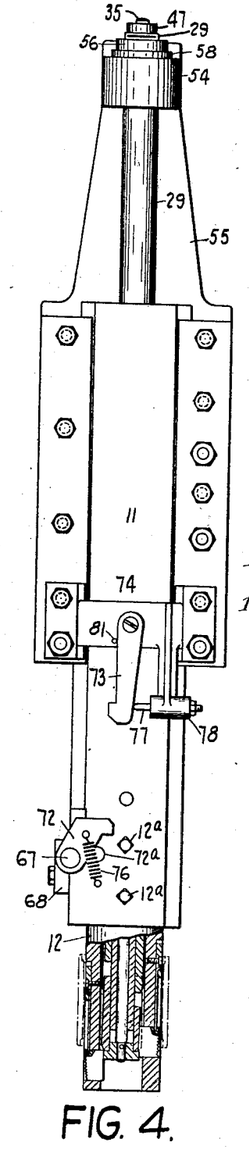
Figure 4 is a front elevation, partly in section, of a portion of the apparatus, showing further details in the construction of my improved tapping tool.
Figure 5:
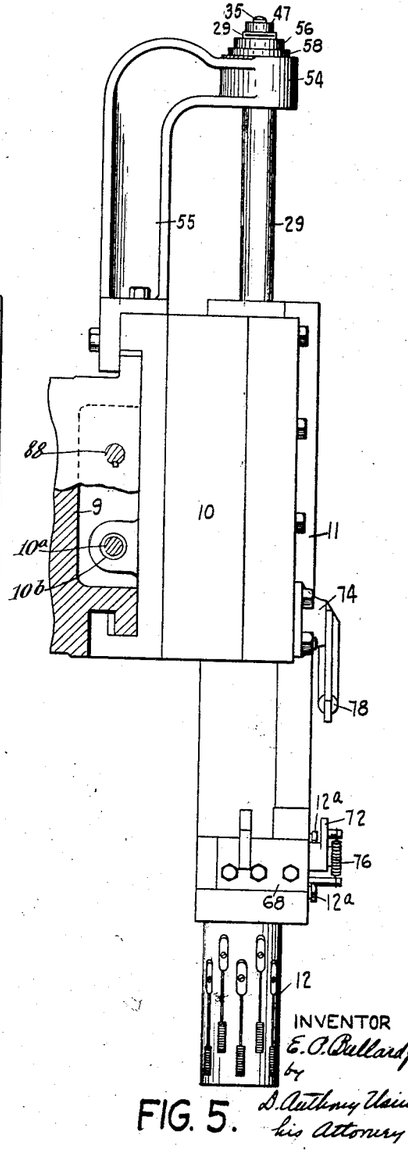
Figure 5 is a side elevation of the parts of the apparatus shown in Figure 4.

The cam bar is released by means of the swinging latch 72 on one end of the shaft 67 and the depending tripping lever 73, which is pivotally secured at its upper end to the bracket 74. The bracket 74 is fastened by bolts 75 to the guides on the cross-head 10 in which the tool post 11 slides vertically. The latch 72 is moved into and yieldingly held in position for engagement with the trip lever 73 by the spring 76, and the lever 73 is yieldingly held in depending position by a spring pressed horizontally reciprocating pin 77 which is mounted in a bearing 78 on the lower end of the depending arm forming part of the bracket 74. The spring 79 and pin 77 holds the tripping lever 73 in advanced position, in the path of the latch 72, as will be readily understood by reference to Figures 6 and 7 of the drawings. Swinging movement of the latch 72 in one direction is limited by the projecting pin 72$^a$ on the face of the tool post 11 and of the tripping lever 73 by the projecting pin 81 on the bracket 74. (See Figure 4.)

Provision is made for feeding the tool post 11 downwardly slowly by a suitable power-feed and the tool post also is arranged for a quick return motion by power and manually.

The feed mechanism may be either of the several known constructions. In the particular mechanism shown, a rack 82 is provided on one face of the tool post 11, which is in mesh with a pinion 84 on the shaft 85. This shaft, which is mounted in suitable bearings (not shown), has a worm wheel 86 on one end which is in mesh with a worm 87 on the cross-shaft 88. The cross shaft 88 also is rotatably mounted in suitable bearings and is provided at one end with a handwheel 92, rotation of which will rotate the shaft 88, worm 87, wormwheel 86, shaft 85 and pinion 84, so as to move the tool post vertically by hand. The shaft 88 also has a wormwheel 89 loosely mounted thereon and provided with a clutch face adapted to be engaged by a sliding clutch member 89$^a$. The wormwheel 89 meshes with a worm 90 on the shaft 91 which is mounted in bearings (not shown) and is operatively connected to the armature shaft 7 of the driving motor 5 through a train of reducing gearing as follows—

A bevel gear 95 is mounted on the lower end of the shaft 91 and meshes with a bevel gear 96 on a cross shaft 97 which carries a wormwheel 98. The wormwheel 98 meshes with a worm 99 on a worm shaft 100, which shaft carries a gear 101 which is in mesh with a pinion 102 on a shaft 103, and the shaft 103 is coupled to the armature shaft 7. The shaft 100 is also provided with a bevel gear 104 which is in mesh with a ring gear 105 on the bottom of the table 4 so as to rotate the table. The sliding clutch member 89$^a$ is adapted to be engaged in the clutch face of the wormwheel 89 when the tool post is to be moved vertically by the motor 5 through the gearing above described and to be disengaged from said wormwheel when the tool post is to be moved by hand.

The operation of apparatus employing my improved tapping tool, which will be readily understood, is as follows—

The tool post 11, with the chasers sleeve or cage 12 removably secured thereon and with the thread cutters or chasers operatively mounted on the cage 12, and with the cam bar 27 suspended within the bore of the tool post 11, will be lowered either by hand or through the screw feed mechanism, until the trip lever 73 engages with the latch 72 and, through the shaft 67 moves the swinging locking dog 66 out of engagement with the curved bottom of the slot 71 in the cam bar 27. When this occurs the cam bar 27 with the cam members 31 and 32 on the lower end thereof, drops by gravity into its lowermost position.

The length of the particular size of the couplings to be tapped being known, the cam bar 27 and cam 31 will be adjusted upwardly or downwardly by turning the nut 56 on the threaded upper end of the cam bar, and the cam 32 will be adjusted upwardly or downwardly on the cam bar 27 by turning the nut 47 on the upper end of the cam adjusting rod 35 so as to make the plane of intersection of the oppositely inclined cam faces 39 and 43 on the cam members 31, 32, coincide with a horizontal plane in the middle of the length of the coupling A to be tapped, when such coupling is fastened in the chuck 6 on the rotary table 4 of the tapping machine. The set screws in the nuts 56 and 47 are then tightened on the cam bar 27 and cam adjusting rod 35 so as to fasten the parts in adjusted position.

The tool post 11 is then lowered until the dog 66 reaches a position opposite the slot 71 in the cam bar 27, when the dog automatically enters through the slots 69, 70, into the slot 71 and locks the cam bar to the tool post. The spring 76 on the latch 72 acts to rock the shaft 67 and swing the dog 66 into the slot 71. When the tool post 11 is now raised it, through the medium of the dog 66, lifts the cam bar a corresponding distance, which enables a coupling to be fastened by the chuck 6 to the rotary table 4, and makes the apparatus ready for use.

As the tool post 11 ascends, the depending end of the trip lever 73 strikes the upper end of the latch 72 and is moved thereby so as to clear the latch, the pin 77 being moved inwardly in its bearing 78 so as to compress the spring 79. When the lower end of the lever reaches a position above the latch 72 the spring 79 moves the pin outwardly so as to swing the lever 73 and yieldingly hold it in its depending position, (that shown in Figure 7).

After a coupling is fastened in the chuck 6 and the driving motor 5 is started, the tool post 11 is again moved downwardly. At the commencement of the downward movement, the cam bar 27 moves with the tool post. In this downward movement of the tool post 11, the latch 72 engages the depending end of the trip lever 72, and causes the latch to swing against the action of the spring 76 so as to rock the shaft 67 and gradually move the dog 66 out of the slot 71 in the enlarged portion 28 of the cam lever 27. When the dog 66 is moved out of the slot 71 the cam bar is freed and it then falls by gravity into its extreme lowered position, (that shown in Figure 8). This falling movement of the cam bar carries the cams 31, 32 on the lower end thereof past the two sets of chasers 16 and 17 in the sleeve 12 into operative position within the now rotating coupling A held on the table 4 by the chuck 6. The above described manipulations, for the sake of speed, are preferably carried out manually, instead of by use of the slower power-feed mechanism.

The power feed is now applied so as to cause the tool post 11 to gradually descend further, and when the lower set of chasers 17 carried in the sleeve 12 reach the upper cam member 31, the chasers 17 enter the registering grooves 40 in this upper cam member, but as these chasers chase the thread on the lower half of the coupling, they do not commence to cut at this time.

Continued downward movement of the tool post brings the lower ends of the upper set of chasers 16 into cutting engagement with the upper end of the rotating coupling, these chasers at this time riding on the taper cam faces 39 of the upper cam member 31 and this cam member, on account of its downwardly and inwardly inclined cam faces, permits the chasers to move radially inward within the slots 14 of the chaser sleeve 12, and in this way cut an internal thread on the upper half of the length of the coupling which tapers downwardly and inwardly.

Before the thread on the upper half of the coupling is completed, the lower set of chasers 17 will have reached the cam faces 43 on the lower cam member 32 and have started to cut a thread on the coupling. This thread cutting operation will start some little distance above the middle of the length of the coupling, but a continuous thread of even pitch will be formed on the inner surface of the coupling because the distance between the last thread on the lower end of the upper set of chasers 16 and first thread on the upper end of the lower set 17 is a multiple of the pitch of the thread cut by the chasers.

The chasers of the upper set 16, when their thread cutting operation is completed, are positioned within the grooves 44 in the lower cam member 32, being moved inwardly by the springs 18, and when the chasers of the lower set complete their cutting operation, they will move inwardly until in engagement with the periphery of the washer 37 on the lower end of the cam adjusting rod 35, (the position shown in Figure 8). When this position is reached, both sets of chasers 16 and 17 will be in retracted position so as to permit of the tool post 11 being lifted by a quick return movement, and the tapping tool thereby removed from the tapped coupling and avoid the necessity of unscrewing it from the coupling. At the time the chasers reach the position relative to the cam members shown in Figure 8, the slot 71 in the cam bar will again be opposite the slots 69, 70 and the swinging dog 66 on the tool post 11, so the spring 76 on the latch 72 will act to swing the dog 66 into the slot 71 and again lock the cam bar 27 to the tool post 11, so that lifting the tool post will also lift the cam bar and remove it to a position above the tapped coupling which permits this coupling to be removed from the chuck 6 and be replaced by an unthreaded one.

The above described operations are then repeated, in tapping a succession of couplings. It will be obvious, however, that relative adjustment of the cam members 31, 32, on the cam bar and of the cam bar on the machine will be unnecessary unless couplings of another size or different length are to be tapped. In such event the parts will again be adjusted, as has been described, and when required the tapping tool will be removed from the tool post and replaced by another of larger or smaller size.

The advantages of my invention will be appreciated by those skilled in the art. The tapping tool is simple and is easily applied for use on tapping machines of various kinds.

Modifications in the construction and arrangement of the parts of my improved tapping tool may be made without departing from the invention as defined in the appended claims.

It will be obvious that in addition to being applicable for use in tapping couplings on a standard type of a boring mill, my improved tapping tool is readily adapted for use, in the same manner, on various other types of machine tools, such as multiple spindle tapping machines, turret finishing machines and similar apparatus, that is arranged to operate simultaneously on a plurality of pipe couplings or other internally threaded articles.

The cam members may be arranged to cut a thread which does not taper or a thread which tapers downwardly and inwardly, or downwardly and outwardly, instead of a double-taper thread, as with the particular construction shown, within the scope of the appended claims.

I claim:—

1. A coupling tapping tool comprising a tool post having a hollow chaser sleeve thereon, said sleeve having a plurality of radial slots extending through the wall thereof, thread cutting chasers secured in said slots to move radially therein, yielding means for moving and holding said chasers in retracted position within said slots, a pair of cam members in said hollow sleeve arranged to engage and hold the chasers in thread cutting position, said cam members being adjustable relative to each other and lengthwise movable with and relative to said chaser sleeve, and means for causing relative lengthwise movement between the chaser sleeve and said cam members.

2. A coupling tapping tool comprising a tool post having a hollow chaser sleeve thereon, said sleeve having a plurality of radial slots extending through the wall thereof, thread cutting chasers secured in said slots to move radially therein, yielding means for moving and holding said chasers in retracted position within said slots, a pair of cam members in said hollow sleeve arranged to engage and hold the chasers in thread cutting position, said cam members being adjustable relative to each other and lengthwise movable with and relative to said chaser sleeve, and means for causing relative lengthwise movement between the chaser sleeve and said cam members, said means being arranged to move said cam members into position permitting rearward movement of the chasers into collapsed position on said sleeve at the completion of the thread cutting operations.

3. A coupling tapping tool comprising a base, a vertically movable tool post mounted on said base, a hollow chaser sleeve mounted on said tool post, said sleeve having transverse slots therein, spring pressed chasers mounted in said slots, a cam bar mounted within and vertically movable independently of said sleeve, a pair of cam members mounted on said bar, one of said cam members being adjustable on said bar relative to the other cam member, means for adjusting said adjustable cam member, and means for adjusting said cam bar and cam members vertically relative to said sleeve.

4. A coupling tapping tool comprising a base, a vertically movable tool post mounted on said base, a hollow chaser sleeve mounted on said tool post, said sleeve having transverse slots therein, spring pressed chasers mounted in said slots, a cam bar mounted within and vertically movable independently of said sleeve, cam members mounted on said bar, and means for adjusting said cam bar and cam members vertically relative to said sleeve.

5. A coupling tapping tool comprising a base, a hollow vertically movable tool post slidably mounted on said base, a hollow chaser sleeve on one end of said tool post, said sleeve having radially movable thread cutting chasers thereon, a cam bar within said sleeve and extending through said tool post, a bracket on said base through which said cam bar extends, said bar being vertically movable independently and also with said tool post, means on said bar adapted to coact with said bracket to limit downward movement of said cam bar, and cam members on said cam bar adapted to adjust said chasers radially during the thread cutting operations.

6. A coupling tapping device comprising a base, a cross-head adjustably secured on said base, a hollow tool post slidably mounted on said cross-head, a slotted chaser sleeve secured to and extending downward from said tool post, a cam bar mounted within said sleeve and extending upwardly through said hollow tool post, cam members on said cam bar, a plurality of spring pressed thread cutting chasers mounted in recesses in said sleeve and adapted to normally engage said cam members, said cam bar and cams being adapted to have vertical movement independent of said head, means at the upper end of said tool post for limiting the movement of said cam bar, and means for adjusting the position of said cams relative to said chasers.

7. A coupling tapping tool comprising a base, a cross-head on said base, a tool post slidably mounted for vertical movement on said cross-head, a hollow transversely slotted chaser sleeve mounted on said head, spring pressed chasers movably secured in the slots in said sleeve, a cam bar mounted within and vertically movable independently of said sleeve, means for limiting the movement of said cam bar, means for locking said bar and said tool post together for upward movement, and means for automatically releasing said cam bar for downward movement.

8. A coupling tapping device comprising a base, a vertically adjustable cross-head mounted on said base, a tool post mounted on said head, said tool post having a hollow, transversely slotted chaser sleeve thereon, a plurality of spring pressed chasers mounted in the slots in said sleeve, a cam bar mounted within and movable vertically independently of said hollow sleeve, means for limiting the downward movement of said cam bar, a swinging dog mounted on said tool post and adapted to engage said cam bar for locking said cam bar to said tool post to lift the cam bar by said tool post, and a tripping lever adapted to release said dog and allow said bar to fall when the downward movement of said tool post and cam bar reaches a predetermined position.

9. A coupling tapping tool for cutting taper internal threads, comprising a hollow chaser sleeve, thread cutting chasers mounted on said sleeve, said chasers being radially movable on the sleeve, and a pair of cam members within said hollow sleeve arranged to move said chasers radially during lengthwise movement thereof, to thereby form a taper thread within a coupling in engagement with said chasers.

10. A coupling tapping machine comprising a base, a reciprocatory tool post slidably mounted on said base, a hollow, radially slotted chaser sleeve on the lower end of said tool post, a cam bar mounted within said sleeve, a cam mounted on said bar, a plurality of spring pressed chasers movably mounted in the slots in said sleeve and adapted to normally ride on said cam, said cam bar and cam being arranged for vertical movement independent of said tool post, means for limiting the movement of said cam bar, and means for adjusting the position of said cam relative to said chasers.

11. A coupling tapping machine comprising a base, a hollow reciprocatory tool post slidably mounted on said base, a hollow, transversely slotted chaser sleeve secured to the lower end of said tool post, a cam bar mounted within said sleeve, a cam mounted on said bar, a plurality of spring pressed chasers movably mounted in the slots in said sleeve and adapted to ride on said cam in the thread cutting operations, said cam bar and arm being arranged for vertical movement independent of said tool post, means for locking said tool post, chaser sleeve, and cam bar together for vertically upward movement, means for moving the tool post and cam vertically downward, and automatic means for releasing said locking means to allow said cam bar to travel downwardly independent of said tool post and sleeve.

12. A coupling tapping machine comprising a base, a hollow reciprocatory tool post slidably mounted on said base, a hollow, transversely slotted chaser sleeve secured to the lower end of said tool post, a cam bar mounted within said sleeve, a cam mounted on said bar, a plurality of spring pressed chasers movably mounted in the slots in said sleeve and adapted to ride on said cam in the thread cutting operations, said cam bar and arm being arranged for vertical movement independent of said tool post, means for locking said tool post, chaser sleeve, and cam bar together for vertically upward movement, means for moving the tool post and cam vertically downward, and automatic means for releasing said locking means and permitting the cam bar to drop by gravity within said tool post and sleeve during downward movement of the sleeve.

In testimony whereof I have hereunto set my hand.

EDWARD P. BULLARD, Jr.